United States Patent Office 2,884,339
Patented Apr. 28, 1959

2,884,339

METHOD FOR MINIMIZING THE FORMATION OF CRATERS IN SURFACE COATINGS

Hans Dannenberg, Berkeley, Calif., assignor to Shell Development Company, New York, N.Y., a corporation of Delaware No Drawing. Application February 15, 1957
Serial No. 640,317

15 Claims. (Cl. 117—72)

This invention relates to a method for minimizing the formation in coatings of small void areas commonly called "craters" or "pin-holes" in the trade. More particularly, the invention relates to a new method for preventing or greatly lessening the formation of craters and pin-holes in surface coatings prepared from polyepoxides, and to the resulting compositions.

Specifically, the invention provides a new and highly efficient method for preventing or greatly lessening the formation of craters and pin-holes in surface coatings prepared from polyepoxides, and preferably glycidyl polyethers of polyhydric phenols, which comprises effecting at the interface between the substrata and the polyepoxide coating, prior to the cure of the polyepoxide, a thin layer of a linear polymer having a hydrocarbon backbone chain to which is attached (1) a plurality of long open side chains containing at least 12 carbon atoms each and (2) a plurality of polar groups. As a preferred embodiment, the invention provides a method for effecting the layer at the interface which comprises applying a solution of the polymer to the substrata before the application of the polyepoxide coating. As a specially preferred embodiment, the invention provides a method for effecting the layer of polymer at the interface which comprises adding the desired amount of the polymer to the polyepoxide coating before it is applied to the substrata. This embodiment is based on the discovery that the new polymers have unexpected surface activity and when in solution tend to seek solid surfaces. The polymer thus readily passes from the polyepoxide coating to the interface.

Polyglycidyl compounds, and preferably the polyglycidyl ethers of polyhydric phenols (e.g. Epon resins), have been found to be particularly valuable in the preparation of coating compositions because of their good adhesion and excellent chemical resistance. Coatings prepared from these resins, and particularly those of the baking type, however, have the disadvantage of forming small craters or pin-holes during the curing process. These defects are undesirable, particularly in can linings, as they generally permit rusting and weakening of the can structure. Attempts have been made heretofore to prevent the formation of the craters and pin-holes by the addition of various additives, but the results obtained have not been entirely satisfactory. The materials added have either failed to correct the formation of the craters and pin-holes or have been required in such large amounts that they destroy many of the more desirable properties of the coatings. The addition of certain silicon polymers, for example, generally lessens the formation of the craters but it also impairs the adhesion of subsequent coats in multiple coat systems, such as vinyl top coats.

It is an object of the invention, therefore, to provide a method for hindering the formation of craters and pin-holes in polyepoxide surface coatings. It is a further object to provide a new method for preventing or lessening the formation of craters and pin-holes of polyepoxide coatings without affecting the desired properties of the coatings themselves. It is a further object to phovide a method for preventing or lessening of crater and pin-hole formation without materially affecting the adhesion, strength and solvent resistance of the coating. It is a further object to provide a method for preventing cratering which does not impair the adhesion of subsequent coatings. Other objects and advantages of the invention will be apparent from the following detailed description thereof.

It has now been discovered that these and other objects may be accomplished by the process of the invention which comprises effecting at the interface between the substrata and the polyepoxide coating, prior to the cure of the polyepoxide, a thin layer of a linear polymer having a hydrocarbon backbone chain to which is attached (1) a plurality of long open side chains containing at least 12 carbon atoms each, and (2) a plurality of polar groups, such, as, for example, a hydrolyzed copolymer of vinyl acetate and octadecene. As a preferred embodiment, the invention provides a method for effecting the layer of polymer at the interface which comprises adding the desired amount of the polymer to the polyepoxide coating before it is applied to the substrata. As a less preferred embodiment, the invention provides a method for effecting the layer of polymer at the interface which comprises first applying a solution of the polymer to the substrata before the application of the polyepoxide coating.

It has been found that by employing the above-noted special polymer additives as described above, even in very small amounts, such as of the order of 0.05%, the formation of the craters and pin-holes can be prevented or reduced to a very insignificant amount. Further, the addition of the polymers in this amount fails to affect the adhesion of the polyepoxide to the substrata or to affect other properties, such as strength and solvent resistance. In addition, it has been found that the presence of the polymer additive also fails to have any effect on the adhesion of the subsequent coatings. Evidence of the superior properties of the new additives may be found in the examples at the end of the specification.

The polymers used as the crater-preventing additives according to the present invention comprise a special group of polymeric materials having unexpected surface activity. These polymers are obtained by additional polymerization of monomers having such a structure as to provide special groups attached to the hydrocarbon backbone structure of the polymer. These features comprise (1) a plurality of long chain radicals containing at least 12 carbon atoms, and (2) a plurality of polar groups. These two features can be provided by the same monomer, but in most cases they are obtained by copolymerizing two or more different monomers. Examples of monomers which could be used to provide the long open chain radicals include, among others, the alpha-olefins, such as octadecene-1, nonodecene-1, eicosene-1, tetradecene-1, heneicosene-1, dodosene-1, tricosene-1, tetracosene-1, pentacosene-1, hexacosene-1, octacosene-1, nonacosene-1, triacotene-1, and the like, and mixtures thereof and mixtures of these with minor amounts of olefins containing at least 12 carbon atoms, such as decene-1, hexadecene-1, tetradecene-1, pentadecene-1, heptadecene-1 and the like, as well as long chain monomers containing ether, ketone and ester linkages, such as vinyl octadecyl ether, ketone, vinyl octadecyl ether, allyl octadecyl ether, allyl eicosanyl ether, vinyl eicosanyl ether, and the like. Particularly preferred members of this type to be used are the $C_{16}$ to $C_{18}$ alpha-olefins and mixtures thereof with lower alpha-olefins containing less than 16 carbon atoms.

The polar groups present on the hydrocarbon backbone chain are preferably groups which contain a non-metallic negative atom from groups V and VI of the periodic table, such as N, P, O and S. Such polar groups may be exemplified by —OH, —COOH,

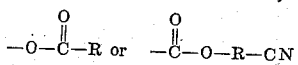

SCN, NH$_2$, —CONH$_2$—SH, and the like. Examples of monomers which provide these groups include, among others, allyl alcohol, methallyl alcohol, vinyl alcohol (polymers of which require special preparation as noted below), crotyl alcohol and the like, unsaturated acids, such as acrylic acid, methacrylic acid, crotonic acid and the like, esters of unsaturated alcohols and monocarboxylic acids, such as vinyl acetate, vinyl propionate, vinyl caproate, and esters of unsaturated monocarboxylic acids and saturated alcohols, such as butyl methacrylate, methyl acrylate, methyl methacrylate, octyl methacrylate and the like, nitriles, such as acrylonitrile and methacrylonitrile, isocyanates, such as allyl isocyanate, allylphenyl isocyanate, amines, such as allyl amine, methallyl amine, amides, such as acrylamide and methacrylamide, and mercaptans, such as allyl mercaptan, allylphenyl mercaptan and the like. Especially preferred are the monomers providing polar groups of the group consisting of —OH, —COOH and

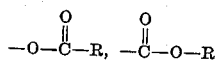

(wherein R is an aliphatic hydrocarbon radical).

The polymers may be prepared in bulk, solvent solution, or in an aqueous emulsion or suspension system. Best results are obtained by heating the monomers in bulk or solvent solution and these are the preferred methods to be employed.

Catalysts used in the preparation of the copolymers are preferably the peroxide catalysts, such as, for example, benzoyl peroxide, lauroyl peroxide, tertiary butyl hydroperoxide, 2,2-bis(tertiary butyl peroxy)butane, di(tertiary butyl) peroxide, tertiary butyl pelargonate, hydrogen peroxide, sodium or potassium persulfate, percarbonate, peracetic acid, and the like. The amount of the catalyst added may vary over a considerable range. In general, the amount of the catalyst added will vary from 0.1% to 5% by weight of the material being polymerized. Preferred amounts vary from 1% to 2% by weight.

The temperature selected will vary depending chiefly on the type of catalyst selected, the desired rate of reaction and molecular weight desired. Generally, the temperature will range from about 100° C. to 170° C. and more preferably from 120° C. to 160° C.

The polymerization may be conducted in the presence or absence of air. In most cases, however, it has been found desirable to conduct the polymerization in the absence of air, e.g., in the presence of an inert gas such as nitrogen. Atmospheric, reduced or superatmospheric pressure may be employed.

At the end of the polymerization, the unreacted monomer or monomers are then removed, preferably by distillation.

An especially preferred group of polymers to be used as the anticratering agents comprise the copolymers of (1) esters of unsaturated alcohols and monocarboxylic acids, and (2) monomers possessing a chain of at least 16 carbon atoms, and especially the olefins containing from 16 to 32 carbon atoms. The copolymers of this group which have particularly superior anti-cratering properties are those having the units of ester and monomer possessing at least 16 carbon atoms in the copolymer in a ratio of from 6:1 to 1:1 and more preferably in a ratio of 1:1 to 5:1. Particularly preferred ratios are 1.5:1 to 4.5:1. The copolymers of superior properties also possess molecular weights ranging from about 4,000 to 50,000 as determined by light scattering technique described in Chem. Rev., vol. 40, page 319 (1948). Preferred molecular weight range from about 15,000 to 30,000.

As the unsaturated esters and the monomer possessing at least 12 carbon atoms have different polymerization rates, the proportions in which they enter the copolymer molecule will differ from the proportions in which they occur in the reaction mixture. It will be necessary, therefore, to determine beforehand the ratio of concentrations of monomers needed to give copolymers having the two monomers in the above-described ratio. This can be easily accomplished by conducting a few routine runs and examining the composition of the resulting copolymer. The initial concentration of monomers can then be adjusted so as to give the copolymer of the desired composition. It has been found by this method, for example, that when the monomers are vinyl acetate and octadecene-1 and they are polymerized in a batch operation at temperature ranges from about 115° C. to 155° C. the vinyl acetate enters the polymer chain at about two times the rate of the olefin. Accordingly, in order to obtain an initial polymer say of ratio of 5:1, the monomers should be combined in a ratio of about 2.5:1.

As the reaction progresses, the monomer concentration ratios change due to the difference in the rate of polymerization and, in some cases, the ratio will change so that it will not be producing copolymers having the monomers in the desired ratio. In this case, some step should be employed to bring the ratio to the right value. This may be accomplished in a variety of ways. One way, for example, comprises stopping the copolymerization after the ratio of the monomer concentrations has reached the limiting value. This method is of particular value if the change in the ratio between the monomer concentrations during the copolymerization is slow and a considerable yield of copolymer has been obtained before the limiting values have been attained.

Another method is to adjust the ratio between the monomer concentrations by adding monomer during the course of the polymerization. In a copolymerization of the above-described special two groups of monomers, it is usually sufficient if the monomer which is consumed the fastest rate, such as the unsaturated ester, is added to the reaction mixture periodically or continuously. To obtain copolymers wherein the greatest part of their macromolecules have the same composition and thus display their superior properties to the highest extent it is preferred to keep the concentrations of the monomers constant as well as the ratio of concentrations constant. This is preferably obtained by adding all of the monomers at the rate at which they are consumed. This greatest uniformity of conditions is generally obtained in a continuous process whereby copolymerization takes place in a space from which the copolymer is drained off at the rate at which it is formed and in which the feed of monomers and other substances employed in the copolymerization exactly compensate for the consumption and drainage taking place when the copolymer is removed.

Control over the change of ratio can be made by periodic withdrawal of sample and analyzing the product or in a homogeneous system by simply observing a physical property of the mixture which varies with the ratio of concentrations of monomers, such as boiling point, refractive index, vapor pressure, specific gravity, and the like, and adding the monomer of monomers so as to bring the value up to the predetermined level for the desired product. This adjustment of the rate of addition can be and sometimes preferably is controlled by some automatic means. In the event that the boiling temperature of the mixture is the method employed in determining the rate of additions, one may use the effect of the varying temperature on the resistance of a metal wire forming part of circuit incorporating a Wheatstone bridge. In this circuit an electric or electronic potentiometer can be inserted which is connected with an electric, pneumatic or hydraulic regulating system controlling a pump or valve in the feed line through which the addition takes place.

An suitable conditions may be employed to maintain the molecular weight within the desired range. Factors which exert an influence on the molecular weight of the polymer include the method of polymerization (e.g., polymerization in emulsion, suspension, solvent solution or bulk), the nature and concentration of the catalyst employed, the temperature, the nature and amount of the monomers and presence of added chain transfer agents. When the polymerization is accomplished in solution, the molecular weight of the product will be lower when the dilution is stronger, i.e., when the concentration of solvent is greater. In general, the higher the polymerization temperature the lower will be the molecular weight of the finished copolymer.

It has further been found that the higher the concentration of the olefin in the reaction mixture, the lower will be the molecular weight of the product. This is illustrated in Examples II to IV with the same monomer ratios, the molecular weights are also higher when the products are prepared by a continuous method wherein one or more of the monomers are added during the reaction.

Added materials that may be used as chain transfer agents in the preparation of the copolymers include alcohols, aldehydes, such as valeraldehyde, ketones, such as acetone, methyl ethyl ketone, ethers such as diethyl ether, halogenated hydrocarbons, as carbon tetrachloride, halogenated alcohols, aldehydes, ethers of organic acids, such as alpha-fromopropionic acid and esters or anhydrides of such acids, such as propyl trichloroacetate, acid halides, such as acetyl chloride, esters of inorganic acids, such as tetraethyl silicate, tributyl phosphate, various nitrogen compounds, such as amines, cyanogen and nitro compounds, sulfur halides, benzene sulphonyl chloride, mercaptans, such as dodecyl mercaptan, and the related organic sulfur compounds. The amount of such agent employed will vary over a wide range but in most cases will be between 1% to 30% by weight of the material being polymerized.

Illustration of a preparation of a vinyl acetate-olefin copolymer is shown below:

VINYL ACETATE-OCTADECENE-COPOLYMER 2.5 moles of vinyl acetate and 1 mole of a mixture of $C_{16}$ to $C_{18}$ alpha olefins made up predominately of the $C_{18}$ olefin and 1% ditertiary butyl peroxide were placed in a stainless steel bomb and the air replaced with nitrogen. The bomb was heated to 115° C. until there was about 90% conversion. The product was topped at 185° C. at 1 mm. Hg pressure. The resulting product was a copolymer possessing a ratio of vinyl acetate and olefin units of 5/1, a molecular weight of 27,000.

Another especially preferred group of polymers possessing unexpected anti-cratering properties comprise the polymers obtained by subjecting the above-described preferred polymers of the unsaturated esters and the monomers possessing at least 12 carbon atoms to partial hydrolysis so as to convert a portion of the ester groups to OH groups. The resulting product will in effect be a tripolymer made up of units of the unsaturated ester, vinyl alcohol and the monomer possessing at least 16 carbon atoms. These tripolymers preferably have an average of from 1 to 6, and preferably 1 to 5 vinyl alcohol units (resulting from the hydrolysis) and unsaturated ester units per unit of the monomer having the chain of at least 16 carbon atoms and preferably up to about 75% and not more than 95% of the vinyl alcohol and vinyl ester units being vinyl alcohol units. These tripolymers also have the preferred molecular weight ranges as described above for the unhydrolyzed copolymers.

The conversion of the copolymers to the hydrolyzed form can be accomplished by saponification using aqueous alkali, such as sodium hydroxide, or by an alcoholysis reaction wherein the copolymer is treated with a lower alkanol or mixture or lower alkanols and a catalyst, such as sodium ethoxide. The amount of reactants used, of course, will be determined by the number of the vinyl ester groups to be removed. If the ester groups are to be removed by the alcoholysis method, for example, there should be approximately one mole of alcohol used for every ester group removed. The degree of alcoholysis can also be controlled by addition of the ester to be found.

After the saponification or alcoholysis reaction, the mixture is then treated to remove the reactants such as formed acid or ester, such as by distillation and then water washed to remove any salt impurities, such as sodium acetate, which may be retained in the product.

Preparation of a hydrolyzed copolymer is shown below:

HYDROLYZED VINYL ACETATE-OLEFIN COPOLYMER

The copolymer of vinyl acetate and the mixture of $C_{16}$ to $C_{18}$ prepared above was mixed with methanol and sodium so as to effect a 95% conversion of the vinyl ester groups to OH groups. This was accomplished by adding 10 parts of methanol, 35 parts of isopropyl alcohol and 1 part of sodium methylate per 50 parts of the copolymer and heating with stirring for 8 hours at 70° C. Sodium acetate was then removed by washing twice with 1 part of a 33% isopropyl alcohol-water mixture. After settling, the lower layer was drained off and all low boiling components stripped off at a temperature of 100° C. at 90 mm. Hg. Analysis of the resulting copolymer, which was a sticky yellow solid, indicated there was 5% acetate groups remaining.

As noted above, the layer of the polymeric additive at the interface may be effected by a variety of methods. It may be effected for example, by merely dipping or spraying or otherwise applying a polymer or a solution thereof directly to the substrata. In this case, the polymer should be applied in sufficient quantity to effect a layer of polymer at least a few molecules thick and preferably a layer of from 30 to 60 molecules thick. This amounts to about 0.7 to 1.4 micrograms of polymer per $cm^2$. This can usually be accomplished by dipping the substrata in 0.08 to 0.5% solution of the polymer in a solvent, such as benzene, two or three times and then allowing the film to dry.

The layer of the polymeric additive at the interface may also be accomplished by adding the polymer directly to the polyepoxide to be applied as the coating and then applying the mixture to the substrata in conventional manner, such as dipping, spraying, etc. As noted above, the new polymeric additives have been found to have special surface activity and tend to seek solid surfaces. They will thus make their way through the coating and form a layer at the interface. The addition of the polymer may be made directly to polyepoxide itself or to a solution containing the polyepoxide. If the polyepoxide is a solid, the polymer may be fused directly into the solid. The amount of the polymeric additive added will generally be quite small as compared to the amount of other additives utilized. Preferred amounts vary from about 0.01% to about 0.8% by weight of solids, and more preferably from 0.01% to 0.3%.

The polyepoxides used in making the coating are those materials possessing more than one

group, i.e., they have an epoxy equivalency greater than 1.0. These compounds may be saturated or unsaturated, aliphatic, cycloaliphatic, aromatic or heterocyclic and may be substituted if desired with substituents, such as chlorine atoms, hydroxyl groups, ether radicals, and the like. They may also be monomeric or polymeric.

For clarity, many of the polyepoxides and particularly those of the polymeric type are described in terms of epoxy equivalent value. The meaning of this expression is described in U.S. 2,633,458.

If the polyepoxide material consists of a single compound and all of the epoxy groups are intact, the epoxy equivalency will be integers, such as 2, 3, 4 and the like. However, in the case of the polymeric type polyepoxides, many of the materials may contain some of the monomeric monoepoxides and/or contain macromolecules of somewhat different molecular weight so the epoxy equivalent values may be quite low and contain fractional values. The polymeric material may, for example, have epoxy equivalent values, such as 1.5, 1.8, 2.5, and the like.

Various examples of polyepoxides that may be used in the process of the invention are given in U.S. 2,633,458 and it is to be understood that so much of the disclosure of that patent relative to examples of polyepoxides is incorporated by reference into this specification.

A group of polyepoxides which are not specifically illustrated in the above patent but are of particular value in the process of the invention are the glycidyl ethers of novalac resins which resins are obtained by condensing an aldehyde with a polyhydric phenol. A typical member of this class is the epoxy resin from formaldehyde 2,2-bis(4-hydroxyphenol)propane novalac resin which contains as predominant constituent the substance represented by the formula

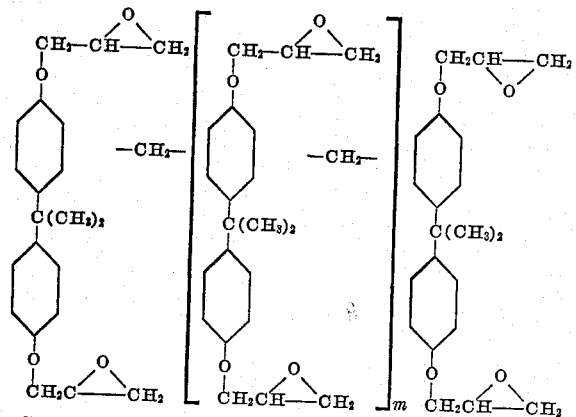

In executing the process of the invention, it is desirable to have the polyepoxide in a mobile liquid condition in order to facilitate application as a coating. The polyepoxides are generally viscous to solid materials at ordinary temperature. With those that are liquid, but too viscous for readily mixing, they are either heated to reduce the viscosity, or have a liquid solvent added thereto in order to provide fluidity. Normally solid members are likewise either melted or mixed with a liquid solvent. Various solvents are suitable for achieving fluidity of the polyepoxides. These may be volatile solvents which escape from the polyether compositions containing the diamine by evaporation before or during the curing such as ketones like acetone, methyl ethyl ketone, methyl isobutyl ketone, isophorone, etc., esters such as ethyl acetate, butyl acetate, Cellosolve acetate (ethylene glycol monoacetate), methyl Cellosolve acetate (acetate of ethylene glycol monomethyl ether), etc.; ether alcohols such as methyl, ethyl or butyl ether of ethylene glycol or diethylene glycol; chlorinated hydrocarbons such as trichloropropane, chloroform, etc. To save expense, these active solvents may be used in admixture with aromatic hydrocarbons such as benzene, toluene, xylene, etc., and/or alcohols such as ethyl, isopropyl or n-butyl alcohol. Solvents which remain in the cured compositions may also be used, such as diethylphthalate, or liquid mono-epoxy compounds including glycidyl allyl ether, glycidyl phenyl ether, styrene oxide, and the like, as well as cyano-substituted hydrocarbons, such as acetonitrile. It is also convenient to employ a glycidyl polyether of the dihydric phenol in admixture with a normally liquid glycidyl polyether of a polyhydric alcohol.

The cure of the coatings is accomplished by the addition of a curing agent and preferably heating. The formation of the craters occurs before the curing takes place so the type of curing agent is not important. The curing agent may be any alkaline, neutral or acidic material known to effect a cure of the polyepoxides. This includes, among others, phenol-aldehyde resins, urea-aldehyde resins, melamine-aldehyde resins, acids or anhydrides, such as citric acid, oxalic acid, phthalic anhydride; Friedel-Crafts metal halides, such as aluminum chloride, zinc chloride, ferric chloride or boron trifluoride as well as complexes thereof with ethers, amines, acid anhydrides, ketones, diazonium salts, etc.; phosphoric acid and partial esters thereof including n-butyl orthophosphate, diethyl orthophosphate and hexaethyl tetraphosphate; amino compounds, such as triethylamine, ethylene diamine, diethylamine, diethylene triamine, triethylene tetraamine, dicyandiamide, melamine; and salts of inorganic acids, such as zinc fluoborate, potassium persulfate, nickel fluoborate, and magnesium perchlorate.

The amount of the curing agents employed may vary over a considerable range, such as from 1% to 200% by weight of the polyepoxide, with the exact range depending on the particular type of agent selected. With curing agents having replaceable hydrogen, such as the amine agents, amounts of agent generally employed vary up to and including equivalent proportions, i.e., sufficient curing agent to furnish a replaceable hydrogen atom for every epoxy group to be reacted. In most cases, satisfactory cures are obtained with amounts varying from 1% to 25% by weight of the materials being polymerized. With the phosphoric acid and esters, particularly preferred amounts vary from about 1% to 10% by weight. The amino compounds are preferably employed in amounts varying from about 3% to 25% and the salts of the inorganic acids, such as the salts of fluoboric acid, are preferably employed in amounts varying from about 3% to 20% by weight. The other curing agents are preferably employed in amounts varying from 1% to 20%.

The cure of the polyepoxides is preferably effected by mixing the curing agent with the polyepoxide and heating. Curing temperatures range generally from room temperature to about 200° C., the exact range preferably depending on the curing agent selected. Active curing agents, such as the aliphatic amines may be utilized, for example, at lower temperatures, such as from room temperature to about 60° C. Less active materials, such as polybasic anhydrides and acids, generally require higher temperatures, such as temperatures ranging from about 60° C. to 150° C. Aromatic amines are preferably employed at the higher temperatures, e.g., temperatures ranging from 60° C. to 150° C.

The substrate on which the coating may be applied may be any material to which coatings are usually applied. This includes wood, plaster, plastics, metals, such as aluminum, steel, iron, copper, tin, glass, textile materials and the like. As noted above, the coatings may be applied as a prime coating to serve as a base for other coatings and particularly vinyl top coatings, such as generally employed in the can industry, or the coating may serve as the top coating itself. If a top coating may be applied directly over the substrata or other prime coatings prepared with the same or other types of materials.

To illustrate the manner in which the invention may be carried out, the following examples are given. It is to be understood, however, that the examples are for the purpose of illustration and the invention is not to be regarded as limited to any of the specific materials recited therein. Unless otherwise specified, parts disclosed in the examples are parts by weights.

The molecular weights of the polymers disclosed in the examples were determined by conventional light scattering method as described above. The $C_{16}$ to $C_{18}$ alpha-olefin mixtures referred to are those made up predominantly of the $C_{18}$ olefin.

Cratering of the surface coatings is reported in the examples in terms of numerical scale. The rating is as follows:

| Rating | Number of Craters (as determined with a microscope) |
|---|---|
| 0 | 0. |
| 1 | 1-10. |
| 2 | 10-25. |
| 3 | 25-50. |
| 4 | 50-100. |
| 5 | greater than 100. |

As it is believed that dust particles initiate formation of the craters, the coated panels shown in the examples were all exposed to the laboratory atmosphere for several hours so as to permit collection of dust before the baking was done.

*Example I*

This example illustrates the unexpected results as to crater formation that are obtained by adding a small amount of a copolymer of vinyl acetate and a mixture of $C_{16}$ to $C_{18}$ alpha-olefin to a surface coating containing a glycidyl polyether of 2,2-bis(4-hydroxyphenyl) propane having a melting point of 145° C. to 150° C. 2400 grams of the resin contains one gram-equivalent of epoxide.

(a) A coating composition was prepared by mixing 210 parts of the above-described glycidyl polyether with 311 parts xylene and 417 parts isophorone. To this composition was added 0.1% based on solids of a copolymer of vinyl acetate and a mixture of $C_{16}$ to $C_{18}$ alpha-olefins in a mole ratio of 5:1 and a molecular weight of 15,000. The coating was then applied to tin plate and baked at 204° C. for 10 minutes. The resulting coating had a crater rating of 0.

(b) The same coating composition prepared without the copolymer additive and cured on tin plate as noted above had a crater rating of 5.

(c) Portions of the same coating composition with 0.1% of each of the following additives in place of the copolymer additives were also prepared and cured on tin plate as noted above. The crater ratings are shown in the table.

| Additive: | Crater rating |
|---|---|
| Tide | 5 |
| Basic calcium salt of petroleum sulfonic acids | 4 |
| Calcium salt of $C_{14}$ to $C_{18}$ alkyl salicyclic acid | 4 |

A comparison of the results obtained in (b) and (c) above with the results obtained in (a) above clearly indicate the unexpected nature of the present discovery.

*Example II*

Example I(a) was repeated with the exception that the copolymer had an ester to olefin ratio of 3:1 and a molecular weight of 15,000. The crater rating in this case was also 0.

*Example III*

Example I(a) was repeated with the exception that the coating composition contained a phenol-formaldehyde resin as the curing agent, and the amount of copolymer was 0.05%.

In this experiment, the coating composition was prepared by making up a solution containing 20.6% of the glycidyl polyether defined in Example I, 6.8% of a commercial phenol-formaldehyde resin, 36.27% xylene and 36.27% isophorone. To this composition was added 0.05% of a copolymer of vinyl acetate and a mixture of $C_{16}$ to $C_{18}$ olefins. This copolymer had an ester to olefin ratio of 5:1 and a molecular weight of 15,000. The coating was applied to tin plate and baked at 204° C. for 10 minutes. The resulting coating had a crater rating of 0. The coating also displayed good water resistance and good solvent resistance and adhesion.

*Example IV*

This example illustrates the method for obtaining the superior improvement in resistance to crater formation by first treating the substrata with a solution containing the copolymer.

A copolymer of vinyl acetate and $C_{16}$ to $C_{18}$ alpha-olefin mixture having a ratio of ester to olefin of 3:1 and a molecular weight of 15,000 was added to benzene to form a 0.1% solution. Tin plate was dipped into this solution and the excess allowed to run off. This procedure was repeated two more times and then the coated plate was allowed to dry.

A coating composition was then prepared by mixing 210 parts of a glycidyl polyether of 2,2-bis(4-hydroxyphenyl) propane having a melting point of 145° C. to 150° C. and an epoxy equivalency of 2400 with 311 parts of xylene and 417 parts of isophorone.

This coating composition was then applied to tin plate by dipping and the coated plate baked at 204° C. for 10 minutes. The resulting coating had a crater value of 0.

This same coating applied to tin plate which had not been treated with the copolymer solution had a crater value of 5.

*Example V*

This example illustrates the unexpected results as to crater formation that are obtained by adding a small amount of a hydrolyzed copolymer of vinyl acetate and a mixture of $C_{16}$ to $C_{18}$ alpha-olefin to a surface coating containing a glycidyl polyether as defined in Example I.

A coating composition was prepared by 210 parts of the glycidyl ether with 311 parts of xylene and 417 parts isophorone. To this composition was added 0.05% of a hydrolyzed copolymer of vinyl acetate and $C_{16}$ to $C_{18}$ alpha-olefin. The original copolymer (unhydrolyzed) had an ester to olefin ratio of 3:1 and a molecular weight of 20,000 and was subjected to 45% hydrolysis. The coating was then applied to tin plate and baked at 204° C. for 10 minutes. The resulting coating had a crater rating of 0.

*Example VI*

Example V was repeated with the exception that the composition of the copolymer additive was varied. The composition of the copolymer and the crater rating obtained in each case are shown in the table below:

| Copolymer | | | Crater Rating |
|---|---|---|---|
| Ester:Olefin Ratio | Molecular Weight | Percent Hydrolyzed | |
| 4:1 | 20,000 | 55 | 0 |
| 5:1 | 35,000 | 79 | 0 |
| 3.4:1 | 8,000 | 48 | 0 |
| 3:1 | 15,000 | 86 | 1 |

*Example VII*

Examples V and VI were repeated with the exception that the hydrolyzed copolymer was applied to the tin plate as a benzene solution as in Example IV instead of the coating composition. In each case, the crater rating was 0.

*Example VIII*

A coating composition was prepared by making up a solution containing 20.6% of the glycidyl polyether defined in Example I, 6.8% of a commercial phenol-formaldehyde resin, 36.27% xylene and 36.27% isophorone. To this composition was added 0.05% of a hydrolyzed copolymer of vinyl acetate and $C_{14}$ to $C_{18}$ alpha-olefin. The original copolymer had an ester to olefin ratio of 3:1 and a molecular weight of 20,000 and was 45% hydrolyzed. The coating was then applied to tin plate and baked at 204° C. for 10 minutes. The resulting coating had a crater rating of 0. The coating also displayed the same solvent resistance and adhesion as the coating without the copolymer.

Example IX

Example VIII was repeated with the exception that the composition of the hydrolyzed copolymer additive was varied. The composition of the copolymer and the crater rating obtained in each case are shown in the table below:

| Copolymer | | | Crater Rating |
|---|---|---|---|
| Ester:Olefin Ratio | Molecular Weight | Percent Hydrolyzed | |
| 4:1 | 20,000 | 55 | 0 |
| 4.3:1 | 16,000 | 95 | 0 |
| 2:1 | 10,000 | 86 | 0 |
| 5:1 | 35,000 | 79 | 1 |
| 3.4:1 | 8,000 | 48 | 0 |

Example X

Examples VIII and IX were repeated with the exception that the hydrolyzed copolymer was applied to the tin plate as a benzene solution as in Example IV instead of the coating composition. In each case, the crater rating was 0.

Example XI

A copolymer of octadecene-1 and acrylic acid having a ratio of acid to olefin of 1.5:1 and a molecular weight of 6,000 was added to benzene to form a 0.1% solution. Tin plate was dipped into this solution and the excess allowed to run off. This procedure was repeated two more times and then the coated plate allowed to dry.

A coating composition was prepared by mixing 210 parts of the glycidyl polyether defined in Example I with 311 parts of xylene and 417 parts of isophorone and adding 10 parts of diethylene triamine. This coating composition was then applied by brushing to the plate with the copolymer and the coated plate baked at 200° C. for 1 hour. The resulting coating had a crater value of 0. The coating also displayed good adhesion and solvent resistance.

Example XII

Examples I, II, III, V and VIII are repeated with the exception that the glycidyl polyether employed is a glycidyl polyether of 2,2-bis(4-hydroxyphenyl)propane having a melting point of 95–105° C. and an epoxy equivalency of 870. In each case, crater ratings of 0–1 are obtained.

Example XIII

Examples I, II, III, and IV are repeated with the exception that the copolymer used is a copolymer of vinyl propionate and $C_{20}$ alpha-olefin wherein the ester to olefin ratio is 4:1 and the molecular weight is about 15,000. In this case also, the coatings are free of crater formation.

Example XIV

Examples V and VII are repeated with the exception that the copolymer used is a 45% hydrolyzed copolymer of vinyl propionate and $C_{18}$ alpha-olefin described in Example XIII. In each case, crater ratings of 0–1 are obtained.

Example XV

A coating composition was prepared by mixing 210 parts of the glycidyl polyether defined in Example I with 311 parts of xylene and 417 parts of isophorone. To this coating was added 0.05% by weight of solids of a copolymer of vinyl acetate, acrylonitrile and octadecene-1 having the ester, acrylonitrile and olefin units in a ratio of 5:1:1 and a molecular weight of 11,900. This coating was applied to tin plate and the coated plate baked at 200° C. for 1 hour. The resulting coating had a crater rating of 1.

Example XVI

Examples I, II, III, V and VIII are repeated with the exception that the coating was applied to glass plate and cold rolled steel plate instead of the tin plate. The resulting coatings are free of craters.

Example XVII

Examples I, II, III, V and VIII are repeated with the exception that the glycidyl polyether employed is a glycidyl polyether of 2,2-bis(4-hydroxyphenyl)propane having a melting point of 65–75° C. and an epoxy equivalency of 450. The coatings obtained in these cases are also substantially free of craters.

Example XVIII

This example illustrates the excellent adhesion that the coatings containing the polymer anti-cratering agents have for top coatings, such as vinyl coatings.

A coating composition was prepared mixing 20.6% of the glycidyl polyether defined in Example I, 6.8% of a commercial phenol-formaldehyde resin, 36.27% xylene and 36.27% isophorone. To this composition was added 0.05% copolymer of vinyl acetate and a mixture of $C_{16}$ to $C_{18}$ olefins which had an ester to olefin ratio of 5:1 and a molecular weight of 15,000. This coating was applied to tin plate and baked at 240° C. for 10 minutes. This coating had a crater rating of 0.

A vinyl coating (copolymer of vinyl chloride and vinyl acetate) was applied to the coated plate produced above and after drying, the coated panel was boiling for ½ hour in distilled water. A piece of tape was applied to the coating and then pulled off. The vinyl coating was not affected by this procedure. However, when the same procedure was applied to a similar coating which contained a silicon polymer in place of the vinyl acetate-olefin copolymer, a portion of the vinyl coat was removed with the tape.

I claim as my invention:

1. A process for minimizing the formation of craters in surface coatings prepared from polyepoxides which comprises effecting at the interface between the substrata which is selected from the group consisting of metal, wood, plaster, plastic, glass and textiles and the polyepoxide coating a layer of a linear polymer having a main hydrocarbon chain to which is attached (1) a plurality of long open side chains containing at least 12 carbon atoms each, and (2) a plurality of polar groups, prior to the cure of the polyepoxide.

2. A process as in claim 1 wherein the polyepoxide is a glycidyl polyether of a polyhydric phenol having an epoxy equivalency greater than 1.0.

3. A process as in claim 1 wherein the linear polymer is a copolymer of (1) ester of an ethylenically unsaturated alcohol and a saturated monocarboxylic acid and (2) a monoethylenically unsaturated monomer possessing a chain of at least 16 carbon atoms.

4. A process for minimizing the formation of craters in surface coatings prepared from polyepoxides having an epoxy equivalency greater than 1.0 which comprises adding to the polyepoxide composition prior to application to the substrata which is selected from the group consisting of metal, wood, plaster, plastic, glass and textiles from 0.01% to 1% by weight on solids of a polymer having a main hydrocarbon chain to which is attached (1) a plurality of long alkyl side chains containing from 16 to 32 carbon atoms and (2) a plurality of polar groups selected from the group consisting of ester groups, carboxyl group and hydroxyl group.

5. A process for minimizing the formation of craters in surface coatings prepared from polyepoxides having an epoxy equivalency greater than 1.0 which comprises applying to the surface of the metal substrata prior to application of the polyepoxide a layer 30 to 60 molecules thick of a polymer having a main hydrocarbon chain to which is attached (1) a plurality of long alkyl side chains containing from 16 to 32 carbon atoms and (2) a plurality of polar groups selected from the group consisting of hydroxyl group, carboxyl group and ester groups.

6. A process as in claim 5 wherein the polymer is a copolymer of a vinyl ester of fatty acid containing up to 6 carbon atoms and an alpha olefin containing at least 16 carbon atoms.

7. A process as in claim 5 wherein the polymer is a hydrolyzed copolymer of a vinyl ester of a fatty acid containing up to 6 carbon atoms and an alpha-olefin containing at least 16 carbon atoms.

8. A process as in claim 5 wherein the polymer is a copolymer of an acrylic acid and an alpha-olefin containing at least 16 carbon atoms.

9. A process as in claim 5 wherein the polymer is a copolymer of an allyl ester of a fatty acid and an alpha-olefin containing at least 16 carbon atoms.

10. A process as in claim 5 wherein the polyepoxide composition contains a glycidyl polyether of a polyhydric phenol having an epoxy equivalency between 1.0 and 2.0 and as a curing agent a phenol-aldehyde resin.

11. A process as in claim 5 wherein the polymer having a hydrocarbon backbone chain to which are attached the long alkyl side chains and polar groups is a copolymer of vinyl acetate and a $C_{16}$ to $C_{18}$ mixture of alpha-olefins containing predominate amount of the $C_{18}$ olefin wherein the ratio of acetate to olefin is 6:1 to 1:1.

12. A process as in claim 5 wherein the polymer having a hydrocarbon backbone chain to which are attached the long alkyl side chains and polar groups is a hydrolyzed copolymer obtained by effecting up to 50% hydrolysis of the acetate groups of a copolymer of vinyl acetate and a $C_{16}$ to $C_{18}$ mixture of alpha-olefins containing predominate amount of the $C_{18}$ olefin wherein the ratio of acetate to olefin is 6:1 to 1:1.

13. A composition which on being cured is resistant to crater formation comprising a polyepoxide having an epoxy equivalency greater than 1.0 and a polymer having a main hydrocarbon chain to which is attached (1) a plurality of long open side chains containing at least 12 carbon atoms each and (2) a plurality of polar groups.

14. A composition which on being cured is resistant to crater formation comprising a glycidyl polyether of a polyhydric phenol having an epoxy equivalency greater than 1.0 and a copolymer of a vinyl ester of a fatty acid and an olefin containing from 16 to 32 carbon atoms.

15. A composition which on being cured is resistant to crater formation comprising a glycidyl polyether of 2,2-bis(4-hydroxyphenyl) propane and a copolymer of vinyl acetate and a mixture of $C_{15}$ to $C_{18}$ alpha-olefins wherein the copolymer has the ester and olefin units in a ratio of 6:1 to 1:1 and a molecular weight between 4,000 and 50,000.

References Cited in the file of this patent

UNITED STATES PATENTS 2,602,785   Wiles et al. ------------ July 8, 1952